United States Patent [19]

Pirinen

[11] Patent Number: 5,648,962

[45] Date of Patent: Jul. 15, 1997

[54] BASE STATION IN A CELLULAR RADIO SYSTEM AND A CELLULAR RADIO SYSTEM

[75] Inventor: Mirja Pirinen, Oulu, Finland

[73] Assignee: Nokia Telecommunications OY, Espoo, Finland

[21] Appl. No.: 553,338

[22] PCT Filed: May 24, 1994

[86] PCT No.: PCT/FI94/00207

§ 371 Date: Apr. 10, 1996

§ 102(e) Date: Apr. 10, 1996

[87] PCT Pub. No.: WO95/01496

PCT Pub. Date: Jan. 12, 1995

[30] Foreign Application Priority Data

May 25, 1993 [FI] Finland .................. 932373

[51] Int. Cl.[6] ................................. H04B 7/26
[52] U.S. Cl. ................. 370/338; 370/362; 370/375
[58] Field of Search .................. 370/95.1, 95.3, 370/66, 67, 68, 85.7, 85.9, 99; 455/33.1, 53.1, 34.1, 56.1, 49.1; 379/59, 60

[56] References Cited

U.S. PATENT DOCUMENTS

| | | | |
|---|---|---|---|
| 4,932,024 | 6/1990 | Bonicioli et al. | 370/85.9 |
| 5,095,530 | 3/1992 | Tanaka et al. | 455/33.1 |
| 5,142,534 | 8/1992 | Simpson et al. | |
| 5,420,863 | 5/1995 | Taketsugu et al. | 455/34.1 |
| 5,425,031 | 6/1995 | Otsuka | 370/95.3 |
| 5,535,429 | 7/1996 | Bergenlid et al. | 455/53.1 |

FOREIGN PATENT DOCUMENTS

| | | |
|---|---|---|
| 0439926A3 | 8/1991 | European Pat. Off. |
| 0514878A3 | 11/1992 | European Pat. Off. |
| 0189822 | 8/1996 | European Pat. Off. |
| 3502942A1 | 7/1986 | Germany |
| 89/08355 | 9/1989 | WIPO |

*Primary Examiner*—Douglas W. Olms
*Assistant Examiner*—Chau T. Nguyen
*Attorney, Agent, or Firm*—Cushman Darby & Cushman IP Group of Pillsbury Madison & Sutro LLP

[57] ABSTRACT

A base station for a cellular radio system including switching centers and base stations connected thereto by time-division telecommunication links. The base station includes one or more transceiver units for establishing radio links, a multiplexer/demultiplexer for multiplexing transmission channels on the telecommunication links, for extracting synchronization and clock signals, and for demultiplexing data to be sent from the base station to a transmission channel of the telecommunication link. The base station further includes switches for switching respective transceiver units to respective transmission channels of the respective telecommunication links.

14 Claims, 5 Drawing Sheets

BASE STATION IN A CELLULAR RADIO SYSTEM AND A CELLULAR RADIO SYSTEM

BACKGROUND OF THE INVENTION

This application claims benefit of international application PCT/FI94/00207 filed May 25, 1994.

Field of the Invention

The invention relates to a base station for a cellular radio system comprising switching centres and base stations connected thereto through time-division telecommunication links, this base station comprising: transceiver units, a multiplexer/demultiplexer means for multiplexing the telecommunication links and for demultiplexing data to be sent from the base station to the telecommunication link and, a switching means for selectively switching the desired transceiver unit to the desired telecommunication link.

Background of the Invention

In typical cellular radio systems the switching centres, e.g. mobile services switching centres, are in contact with mobile phone subscribers through radio transmitters of base stations. Base stations can be connected to switching centres via base station controllers. A base station of the prior art comprises an antenna unit to which one or more transceiver units are connected, each of the transceiver units being connected via a multiplexer/demultiplexer means to a transmission channel of a telecommunication link and further, either directly or via a base station controller, to the switching centre of the cellular radio system.

A prior art solution is described in the publication EP 439 926, which discloses a base station of a radio communication system where the control unit of the base station can switch any radio unit through a bus to a digital interface circuit. The object of the cited reference is to provide a system which enables flexible handling of both analog and digital radio channel units in the same system. The problem with the solution according to the cited EP publication is that the base station disclosed therein is not capable of recovering from a situation where a fault has occurred in one of its transceiver units during normal operation. The solution disclosed does not possess a feature by means of which the operations and maintenance unit of the system would continuously receive fault information on the occurrence of faults in transceivers and could, on the basis of this fault information, switch the faulty transceiver unit off and, correspondingly, switch on a new, undamaged transceiver unit to replace the faulty one.

In the prior art solutions it has been impossible to replace a transceiver unit which transmits a certain transmission channel of a telecommunication link to the radio link and which is possibly faulty or requires maintenance with another, operative transceiver unit in a flexible manner and by remote control.

SUMMARY OF THE INVENTION

The object of the present invention is to obviate the above problems pertaining to the prior art and to provide a base station which flexibly both allocates and releases radio channels, and a cellular radio system.

This new type of base station for a cellular radio system is achieved with a cellular radio system according to the invention, which is characterized in that the switching means for the base station is a time slot switch comprising: a time slot counter for synchronizing the time slot switch with the time slots of the time-division bus, a time slot selection register responsive to operations and maintenance information including time slot selection data for time slot-specific storing and reading of the time slot selection data, a comparing means for comparing the time slot selection data contained in the time slot selection register with the state of the time slot counter at a given point of time in such a manner that the time slot selection data is compared with the state of the time slot counter and, responsive to the result of this comparison, the data contained in the time slot concerned on the telecommunication link or at the transceiver is transmitted forward, a buffer means responsive to the data supplied by the comparing means for storing data contained on the telecommunication link and for feeding the data into a transceiver unit, or for feeding data contained at a transceiver unit into the desired time slot on the telecommunication link.

The invention is based on the idea that a transmission channel of a telecommunication link which is to be transmitted to the base station of a cellular radio system is conducted to a switching means, which switches the transmission channel to the desired transceiver unit.

The advantage of such a cellular radio system and base station according to the invention is that the desired transmission links, typically speech or telecommunication channels, can be switched to the desired transceiver unit operating at the base station on a certain radio frequency. Typically, this takes place when the radio channel on which a certain speech or telecommunication channel is transmitted is to be changed or when a transmission channel transmitting and receiving a certain channel is damaged.

Another advantage of the invention is that it is possible to provide the base station with an extra transceiver unit, which the time slot switch according to the invention switches on when necessary. Such a redundant transceiver unit does not require a separate, fixedly allocated transmission channel, but the transmission channel previously used by the broken transceiver unit will be allocated to it. Thus, it is not necessary to assign redundant connections to a redundant transceiver unit, which reduces the transmission channel costs of a cellular radio system.

It is also to be noted that the invention enables a solution in which two or more base stations have at least partly common transmission channels, which can be allocated to the transceiver units of a base station according to the load of the base station. Therefore, it is possible to select the number of transmission channels according to how many transmission channels the base station needs on the average.

Yet another advantage of the invention is that the operations and maintenance centre of the cellular radio system, the base station controller or the base station-specific operations and maintenance unit can, if desired, command a transceiver unit either to operate or to stop operating automatically, by adjusting a time slot switch connected to this transceiver unit.

The above-mentioned advantage of the invention leads to a further advantage: as, according to the invention, it is possible to select from among the transceiver units of a base station those which are operating, the transceiver units that are not needed can be switched off. Thus, the transceiver units that have been switched off do not unnecessarily consume power at the base station, and they do not disturb the other base stations of the cellular radio system or other radio traffic by broadcasting the identification signal of the base station "in vain"."

Still another advantage of the cellular radio system according to the invention is that it increases the flexibility in the selection of radio channels used for the transmission of calls to be established from a base station to mobile phones; it is possible to "transfer" more radio channels to the coverage area of a certain base station from the coverage areas of other base stations if the base station which is to be expanded has available "free" transceiver units which can be allocated for this purpose and if there are free channels on the radio path.

As compared with the prior art, the invention also has another, very significant advantage: when transceiver units of a base station in a cellular radio system are to be switched on and/or to be switched to transmit another transmission channel of a telecommunication link to the radio path, this change can be effected by remote control, either from the operations and maintenance centre of the cellular radio system or from the base station controller. In the prior art solutions the change of transceiver units or the switching on of a transceiver unit must be performed manually by a service person sent to the base station, by interchanging cables connected to the transceiver units of the base station.

The invention allows, thus, a faulty transceiver unit of a base station to be replaced with another transceiver unit without having to have a service person visit the base station. As such a visit is not necessary, an operative transceiver unit needed at the base station is brought into operation in the case of a faulty transceiver much faster than if it were necessary to send a service person to the base station. As a result of this, it is more likely that in the present system that the base station has a sufficient number of operative transceiver units than it is in the prior art solutions. The overall reliability of the cellular radio system and its base station improves, and thus the service level of the whole system rises.

A still further advantage of the invention is that the base station according to the invention may be provided with a redundant transceiver unit which, under the control of the operations and maintenance centre, can flexibly be brought into use when the previously used transceiver is damaged. The recovery of a transceiver from the occurrence of a fault is thus an essential feature of the present invention.

BRIEF DESCRIPTION OF THE DRAWINGS

In the following, the invention will be described in greater detail and with reference to the accompanying drawings, in which.

DETAILED DESCRIPTION OF A PREFERRED EMBODIMENT OF THE INVENTION

Figure 1:
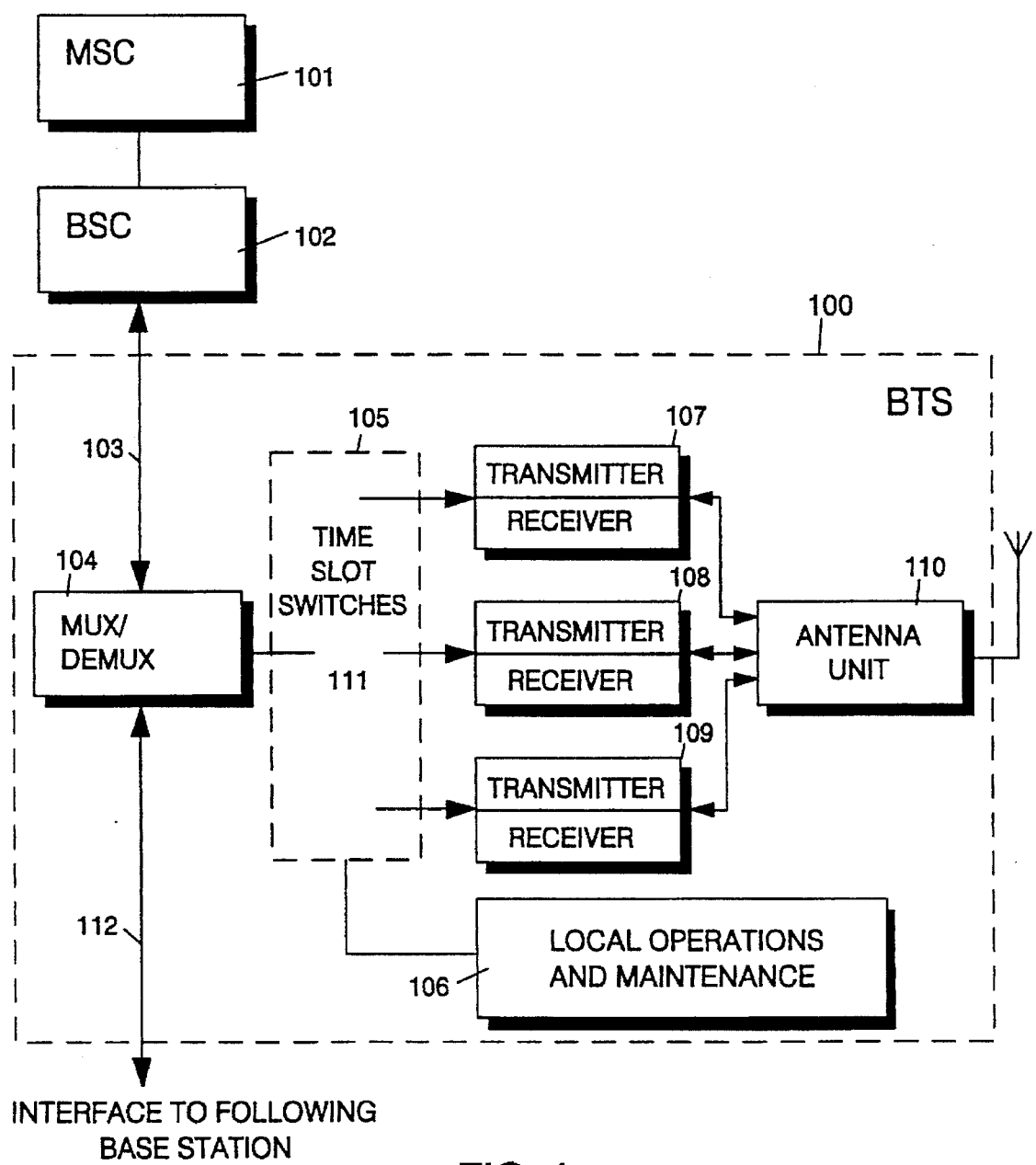
FIG. 1 is a general block diagram of the cellular radio system according to the invention and its base station.
Figure 2:
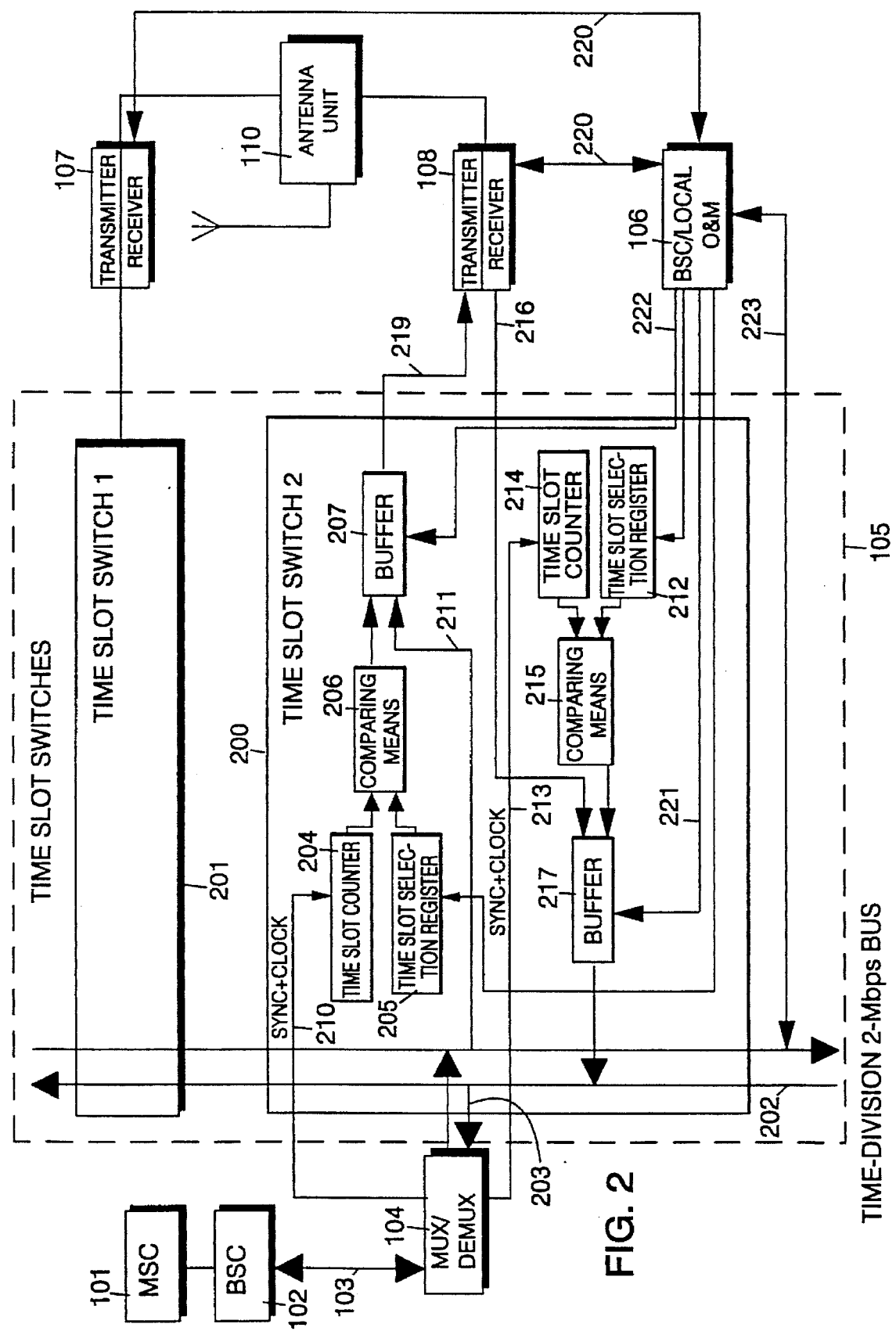
FIG. 2 is a detailed block diagram of the time slot switch provided at the base station of the cellular radio system according to the invention.
Figure 3:
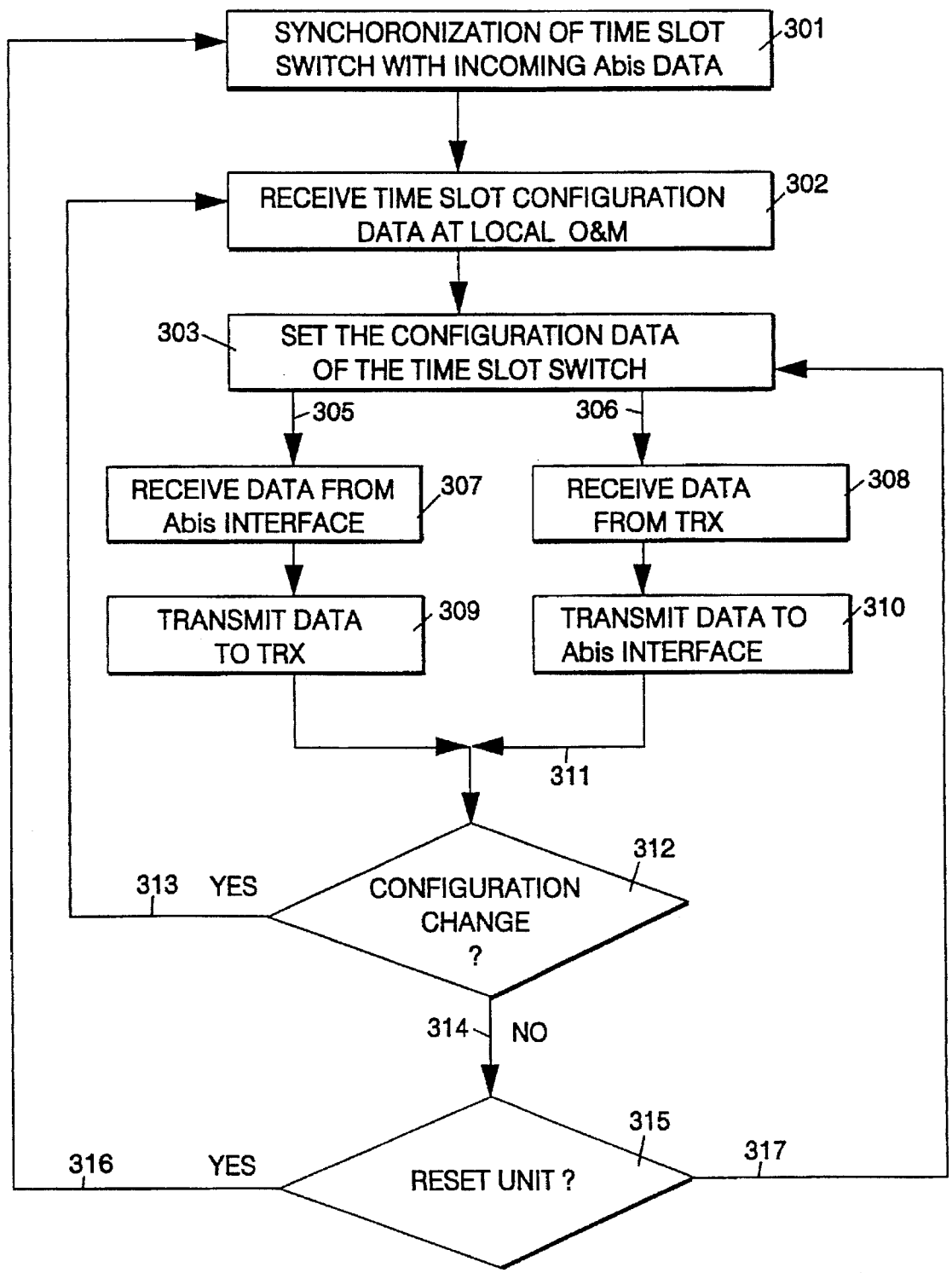
FIG. 3 is a flowchart of the external operation of the time slot switch according to the invention.
Figure 4:
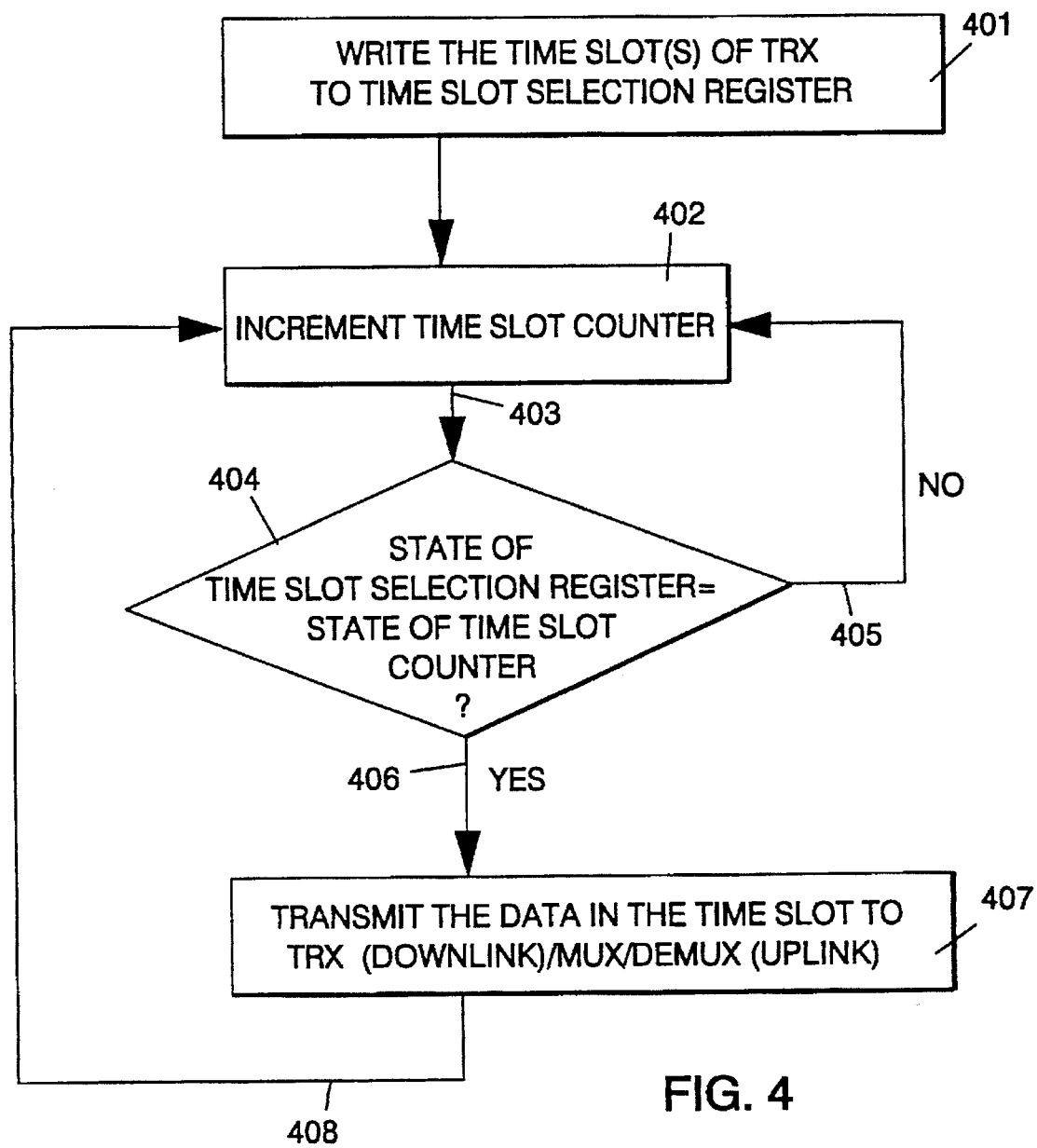
FIG. 4 is a flowchart of the internal operation of the time slot switch according to the invention.

FIG. 1 is a general block diagram of the cellular radio system and the base station BTS 100 according to the invention. The mobile services switching centre MSC 101 of the cellular radio system may be connected to a base station controller BSC, which is further connected to the base station BTS 100 through an Abis interface 103. The Abis interface is described more closely in ETSI/GSM standards GSM 08.51, 08.52, 08.54, 08.56, 08.58 and 08.59 from 1992. The Abis interface 103 is connected to a multiplexer/demultiplexer means MUX/DEMUX 104, which transfers information carried on the Abis interface transparently as such to the internal bus of the base station 100; the internal bus is illustrated in greater detail in FIGS. 2 and 5. The information carried on the Abis interface can be branched so as to be also transmitted to other base stations by means of the multiplexer/demultiplexer means MUX/DEMUX 104 and a junction line 112. From the internal bus of the base station the information is conducted to one of the time slot switches 105 according to the invention, the structure of which is shown in FIG. 2, and the operation of which is shown in FIGS. 3 and 4. The time slot switch guides information from the Abis interface, i.e. information on a certain speech or telecommunication channel, to the desired transceiver 107, 108, 109. By means of the time slot switch 105 of the invention it is also possible to branch information sent to a certain base station 100 so that it is also sent to another base station by selecting transceiver units 107, 108, 109 of several base stations for the operation. These transceiver units are selected according to the need the telecommunication links have for transmission channels. The selection of transceivers 107, 108, 109 located at several base stations 100 by means of the time slot switches 105 of the base stations 100 is controlled by the operations and maintenance centre 106 of the cellular radio system. The operations and maintenance centre 106 may be associated with the base station 100, the base station controller 102, or the switching centre 101 in such a manner that the transmission capacity of telecommunication links is allocated to the traffic between those base stations and base station controllers or those switching centres of the cellular radio system and base stations that need it. The transceivers are known to those skilled in the art and have been generally used at base stations of cellular radio systems. Each transceiver is connected to an antenna unit 110 which is common to all of the transceiver units and from which the radio messages to be sent are transmitted to the radio path.

FIG. 2 is a detailed block diagram of a representative one, 200, of the time slot switches 105 provided at the base station of the cellular radio system. The multiplexer/demultiplexer means 104 multiplexes 203 data to the internal data transmission bus 202 of the base station 100 and demultiplexes 203 in the opposite direction from the bus, i.e. to the Abis interface 103 between the base station and the base station controller 102. The time slot switch has two directions of operation: downlink, i.e. from the cellular radio system and its switching centre towards a radio subscriber, and uplink, i.e. from a radio subscriber towards the cellular radio system and its network.

The time slot switch and its operation in the downlink direction will be dealt with in the following. A clock signal CLOCK and a synchronization signal SYNC are supplied from the multiplexer/demultiplexer means 104 to a time slot counter 204. The time slot counter synchronizes the time slot switch with PCM data from the Abis interface. The time slot counter is a 5-bit counter which counts time slots from zero to 31 (00000→11111). Time slot/setting data of five bits is supplied from a local operations and maintenance centre LOCAL O&M or a base station controller BSC 106 to a time slot selection register 205. In this case these five bits constitute the time slot selection data which is stored time slot-specifically in the memory of the time slot selection register 205. The memory of the time slot selection register 205 comprises a five-bit register per each time slot of a transceiver. The register stores time slot selection data, i.e. the identifier of the time slot from which the data to be transmitted to the time slot of the transceiver should be taken and transmitted forward. If the system employs 16-kbit/s signalling, the register must use extra bits to indicate in which quarter of a time slot signalling is needed. In the downlink direction, the time slot counter 204 monitors which time slot/time slots from the Abis interface 103 is/are transmitted through the multiplexer 104 to the internal bus 202 of the base station. When the time slot/time slots set in the time slot selection register 205 by the operations and maintenance unit is/are received, it/they are observed by a comparing means 206 connected to the time slot counter and the time slot selection register. In the comparing means, the value stored in the time slot selection register 205 is compared with the state of the time slot counter 204. If the states are identical, e.g. the value 8 has been selected for the time slot in the time slot selection register and the value of the time slot counter is also 8, the data contained in the time slot concerned is loaded into a buffer means 207 connected to the comparing means 206. The information to be sent from the buffer means is transferred to a transceiver unit (typically there is one transceiver unit per each time slot counter). The entire base station may comprise several time slot switches 105, (e.g.,200, 201 . . . ) and several transceiver units 108, 107. There may, of course, be an optional, even a greater number of transceiver units.

Information to be sent in the uplink direction is supplied from the receiver of the transceiver 108 to a buffer 217. In the same way as in the downlink direction, there is in the uplink direction also provided a time slot counter 214, which is synchronized with PCM data from the Abis interface 103. In its structure and operation the time slot counter of the uplink direction corresponds to the counter of the downlink direction. The local operations and maintenance unit 106 of the base station or the operations and maintenance centre of the cellular radio system, either in connection with the switching centre 101 or the base station controller 102, controls a time slot selection register 212. The identifier of the time slot into which the signal received by the transceiver 108 and supplied to the time slot switch 200 concerned is to be inserted is stored time slot-specifically and through the operations and maintenance unit in the memory of the time slot selection register 212. Per each time slot of the transceiver unit the time slot selection register has a five-bit register, which may be expanded in the case of 16-kbit/s signalling. In the same way as in the downlink direction, a synchronization signal SYNC and a clock signal CLOCK are supplied 213 from the multiplexer/demultiplexer means to a time slot counter 214. The contents of both the time slot counter 214 and the time slot selection register 212 are conducted to a comparing means 215. The comparing means compares the value stored in the time slot selection register 212 with the value contained in the time slot counter. If these values or states are identical, e.g. the value 8 has been selected for the time slot in the time slot selection register and the value of the time slot counter is 8, the data loaded into the buffer 217 is inserted into the time slot assigned for the transceiver unit 108 on the internal time-division bus 202 of the base station. From this bus, the data is further transferred by means of the multiplexer/demultiplexer means 104 to the Abis interface 103 between the base station and the base station controller 102. Through the Abis interface the data is transferred to the base station controller 102 to be further transmitted to the switching centre 101 of the cellular radio system.

It should be noted that there must be at least one time slot switch 200, 201 per each transceiver unit 107, 108, 109 of the base station. A time-division 2-Mbit/s bus 202 with separate reception and transmission lines is used for data transmission between the multiplexer/demultiplexer means and the time slot switches 200, 201. The operation of the time-division bus is described more closely in connection with FIG. 5.

FIG. 3 is a flowchart of the external operation of the time slot switch according to the invention (FIG. 2). In step 301, the time slot switch is synchronized with PCM data from the Abis interface (FIG. 2, 103). Thereafter, the necessary time slot configuration data are received 302 at the local operations and maintenance unit (FIG. 2, 106) O&M. Subsequently, these configuration data, i.e. information on from which time slot of the Abis interface the data to a certain transceiver unit TRX is to be picked or into which time slot of the Abis interface it is to be inserted, are sent 303 to the time slot switch, more specifically, to its time slot selection registers (FIG. 2, 205, 212). Thereafter, after, the operation of the time slot switch is divided into two branches 305 and 306. If branch 305 is chosen, the time slot switch (FIG. 2, 200) receives data from the Abis interface (FIG. 2, 103) in step 307 and sends the data to the transceiver unit TRX (FIG. 2, 108) in step 309. If branch 306 is chosen, the time slot switch (FIG. 2, 200) receives data 308 from the transceiver unit TRX (FIG. 2, 108) and sends (310) this data to the correct time slot on the Abis interface (FIG. 2, 103). Both branches 305, 306 of operation are then combined, and the time slot switch determines 312 whether it should change the configuration data. If the configuration data must be changed, i.e. if the data to or from the transceiver unit TRX is to be transmitted to or received from a different time slot on the Abis interface, the time slot switch loads again new configuration data into the local operations and maintenance unit or some other operations and maintenance unit, whereafter the implementation of the invention is continued in accordance with the flowchart shown in the figure. The reason for the configuration change will be explained in the following. The transceivers 107, 108 test their operation all the time by various tests and test loops. Examples of these tests are memory tests for the internal units of transceivers, tests for asic circuits, and testing of interfaces between connections and operations of units. In addition, there are time slot tests, testing of incoming clock signals, and testing or frame numbers. There is also temperature testing of transceiver units to control that the temperature of the unit is kept within suitable limits. Other possible tests are testing of frequencies that are used and testing of power levels. The results of all of these tests are conducted to the local operations and maintenance unit O&M 106. This is performed in such a manner that the transceiver units send information on their state regularly or at suitable intervals to the local O&M unit, for instance over the 2-Mbit/s serial bus 220. The operations and maintenance unit checks that none of the test results calls for measures. If,however, one of the tests gives an alarm, i.e. such a fault has occurred that the transceiver unit concerned must be switched off, the operations and maintenance centre switches the transceiver off. The switching off is effected in such a manner that the enable signal 221, 222 supplied to the buffers 207, 217 of the time slot switch 200 in the transceiver unit 108 is cut off, whereby the buffers enter into three-condition and no longer transmit the information forward. At the same time, the O&M unit switches off the power supply of the transceiver unit 108.

The redundant transceiver is then brought into use in such a manner that the O&M unit starts the power supply of the unit to be brought into use, i.e. switches on its power supply, and the values corresponding with those time slots from which the time slot switch will take information from the time-division bus or into which it will insert information are fed into those time slot registers of the time slot switch which are assigned to the transceiver unit concerned. If the O&M unit observes that the error message given does not require that the operating transceiver unit be changed to another one, the O&M unit does not effect a configuration change, and the following step is to determine 315 whether the time slot switch is to be reset. If the answer is positive 316, the operation returns to step 301, from which it continues in accordance with the diagram. If the answer is negative 317, the operation continues as previously: the old configuration data 303 are set to the time slot switch, whereafter the operation continues as described above. It should be noted that the local operations and maintenance unit 106 can be in contact with other network elements through the bus 223. Thus, the local O&M unit can be controlled by a centralized operations and maintenance centre, the base station controller or the switching centre of the radio system.

FIG. 4 is a flowchart of the internal operation of the time slot switch of the invention (FIG. 2, 200). At first that time slot of the transceiver on the time-division bus (202) from which data are to be picked to the radio path or, correspondingly, the identifier of that time slot on the internal bus of the base station in which data are to be transmitted from the base station to the Abis interface (FIG. 2, 103) is written to the time slot selection register (FIG. 2, 205, 212). Thereafter, the time slot counter (FIG. 2, 204 or 214) must be incremented, whereafter the comparing means (FIG. 2, 206, 215) start to perform comparative operations 404 in which the state of the time slot selection register is compared with that of the time slot counter. If the states are not identical 405, the time slot counter is incremented 402 again and the comparative operation is attempted once more; if the state of the time slot selection register is identical 406 with that of the time slot counter, the operation continues in such a manner that the data contained in the time slot is transmitted in the downlink direction from the buffer (FIG. 2, 207) to the transceiver TRX (FIG. 2). Correspondingly, in the uplink direction, the data taken from a certain time slot of the transceiver and stored in the buffer (FIG. 2, 217) is transmitted to the internal bus (FIG. 2, 202) of the base station and from there to the multiplexer/demultiplexer means to be further transferred to the Abis interface (FIG. 2, 103). After this data transmission, the operation of the time slot switch returns to step 402, in which the time slot counters are incremented, whereafter the operation continues as described above.

Figure 5:
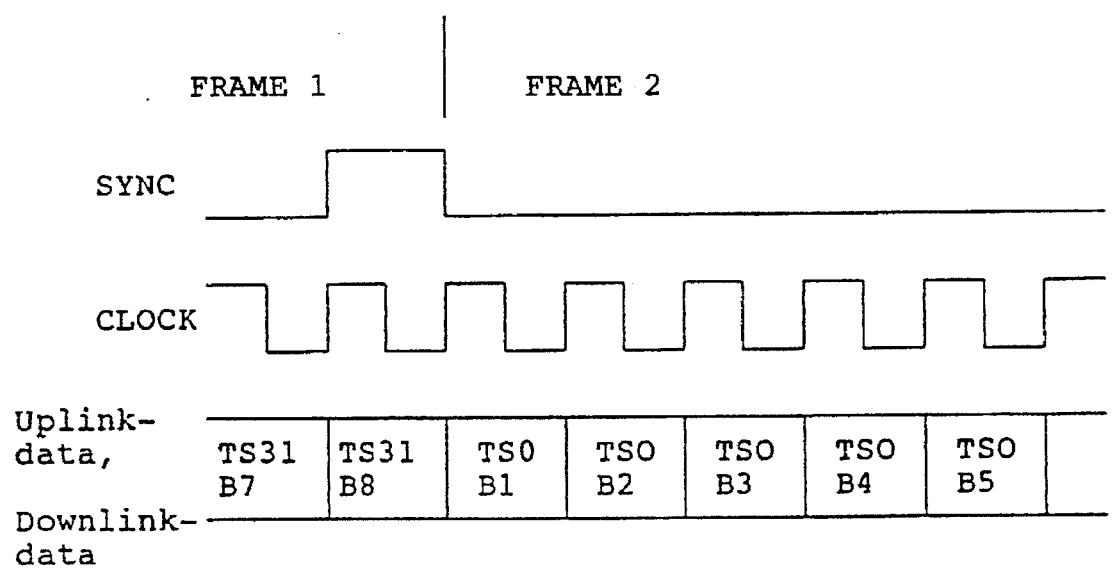
FIG. 5 is a timing diagram of the internal data transmission bus provided at the base station of the cellular radio system according to the invention.

FIG. 5 is a timing diagram of the internal data transmission bus at the base station of the cellular radio system. The base station comprises either several time slot switches or one time slot switch which is provided with the necessary time slot registers, counters, comparing means and buffers per each transceiver unit of the base station. The time slot switches that are provided for each transceiver unit or the corresponding parts are connected to the multiplexer/demultiplexer means (FIG. 2, 104) through the internal time-division 2-Mbit/s bus. The bus is timed by the use of a synchronization signal SYNC and a clock signal CLOCK obtained from the same bus. Both of the signals are generated in the multiplexer/demultiplexer means (FIG. 2, 104) using either the internal clock of the multiplexer or an extremely accurate PCM clock signal obtained through the Abis interface. In FIG. 5, time is represented running from the right to the left. In the internal time-division bus of the base station, the length of one frame is 125 µs, and one frame consists of 32 time slots, which are numbered 0 ... 31 in the figure. Each time slot contains 8 bits. A frame contains thus 32*8=256 bits, and the recurrence frequency of the frame is 8000 times per second. The operation of the bus is described in the following. The time slot counters (FIG. 2, 204, 214) of the time slot switches count at the rising edge of the clock signal CLOCK, and a sample of incoming data is always taken at the falling edge. In the downlink direction, i.e. in the transmission of data from the base station controller and the switching centre to a subscriber station, or mobile phone, the time slot switch picks the bits contained in the time slots assigned to the transceiver connected to the time slot switch, i.e. the data from the internal 2-Mbit/s bus of the base station, by means of time slot grids and time slot counter logic. Correspondingly, in the uplink direction, i.e. in the transmission of data from a subscriber station to the base station controller and the switching centre, the time slots are transmitted to the internal bus of the base station in the time slots assigned to the transceiver unit concerned. The transceiver unit is electrically connected to the internal bus of the base station by means of three-condition buffers, which guide the data to the bus when they receive time slots assigned to them and are in a high-impedance state when they receive other time slots.

The drawings and the descriptions relating thereto are intended merely to illustrate the inventive concept. In its details the base station for a cellular radio system and the cellular radio system according to the invention may vary within the scope of the appended claims. Although the invention has been described above mainly in connection with the GSM mobile phone system, it may also be used in other cellular radio networks.

I claim:

1. A base station for a cellular radio system which has a plurality of switching centres and plurality of base stations connected thereto by respective base station controllers through time-division respective telecommunication links, and an operations and maintenance centre, the base station comprising:

a plurality of transceiver units, a time-division bus providing respective time slots for the base station, a multiplexer/demultiplexer means for multiplexing said telecommunication links and for demultiplexing data to be sent from said time-division bus of said base station to said telecommunication links, at least one switching means for selectively switching respective of the transceiver units to respective of the telecommunication links, the switching means being a time slot switch comprising:

a time slot counter for synchronizing the time slot switch with the time slots of the time-division bus, a time slot selection register responsive to operations and maintenance information including time slot selection data for time slot-specific storing and reading of said time slot selection data, a comparing means for comparing the time slot selection data contained in the time slot selection register with the state of the time slot counter at a given point of time in such a manner that the time slot selection data is compared with the state of the time slot counter and, responsive to the result of this comparison, the date contained in a respective time slot on a respective of said telecommunication links or at a respective one of the transceiver units is transmitted forward, a buffer means responsive to the data supplied by the comparing means for storing data contained on the respective one of said telecommunication links and for feeding the data into a respective one of the transceiver units, and for feeding data contained at a respective one of said transceiver units into the desired time slot on the respective one of said telecommunication links.

2. The base station of claim 1, wherein:

said switching means of said base station is arranged to be controlled by an operations and maintenance unit of said cellular radio system in such a manner that the transmission capacity of said telecommunication links is allocated for the traffic between those of said base stations and said base station controllers or those of said switching centres of said cellular radio system and the base stations which need additional transmission capacity.

3. The base station of claim 2, wherein:

there is one the switching means per each said transceiver unit of said base station.

4. The base station of claim 2, wherein:

the switching means said base station is arranged to be responsive to base station-specific operation and to maintenance units, which are provided and control operation of said base station.

5. The base station of claim 2, wherein:

said switching means of said base station is arranged to be responsive to a respective base station controller of said cellular radio system, which controls operation of said base station, to the respective switching centre of said cellular radio system, or to said operations and maintenance centre of said cellular radio system.

6. The base station of claim 2, wherein:

when information is transmitted from a respective said switching centre of said cellular radio system to a respective the transceiver unit of said base station, said time slot switch is arranged for picking the data from a time slot assigned to the transceiver unit on the time-division bus.

7. The base station of claim 2, wherein:

when information is transmitted from a respective said transceiver unit of said base station in said cellular radio system to a respective said switching centre of said the cellular radio system, said time slot switch is arranged for transmitting the data to said time-division bus in a time slot assigned to the respective the transceiver unit to be further transmitted over the respective said telecommunication link to the respective the switching centre of said cellular radio system or to the respective the base station controller.

8. The base station of claim 2, wherein:

said switching means is arranged to be controlled in such a manner that when one of said transceiver units of said base station becomes broken, an operative one of the transceiver units is allocated in place of said broken transceiver unit, the operative transceiver unit is assigned the respective time slot of the respective telecommunication link which said broken transceiver unit had until then been assigned.

9. The base station of claim 1, wherein:

there is one the switching means per each said transceiver unit of said base station.

10. The base station of claim 1, wherein:

the switching means of said base station is arranged to be responsive to base station-specific operation and to maintenance units, which are provided and control operation of said base station.

11. The base station of claim 1, wherein:

the switching means of said base station is arranged to be responsive to a respective base station controller of said cellular radio system, which controls operation of said base station, to the respective switching centre of said cellular radio system, or to said operations and maintenance centre of said cellular radio system.

12. The base station of claim 1, wherein:

when information is transmitted from a respective the switching centre of said the cellular radio system to a respective the transceiver unit of said base station, said the time slot switch is arranged for picking the data from a time slot assigned to the transceiver unit on the time-division bus.

13. The base station of claim 1, wherein:

when information is transmitted from a respective said transceiver unit of said base station in said cellular radio system to a respective said switching centre of said cellular radio system, said time slot switch is arranged for transmitting the data to said time-division bus in a time slot assigned to the respective the transceiver unit to be further transmitted over the respective said telecommunication link to the respective the switching centre of said cellular radio system or to the respective the base station controller.

14. The base station of claim 1, wherein:

said switching means is arranged to be controlled in such a manner that when one of said transceiver units of said base station becomes broken, an operative one of the transceiver units is allocated in place of said broken transceiver unit, the operative transceiver unit is assigned the respective time slot of the respective telecommunication link which said broken transceiver unit had until then been assigned.

\* \* \* \* \*